Jan. 16, 1940.                J. A. SHAFER                2,187,434
                                CAR TRUCK
                          Filed April 22, 1939         2 Sheets-Sheet 1

INVENTOR
James A. Shafer
BY Albert E. Field
ATTORNEY

Jan. 16, 1940.    J. A. SHAFER    2,187,434
CAR TRUCK
Filed April 22, 1939    2 Sheets-Sheet 2
Fig. 2.
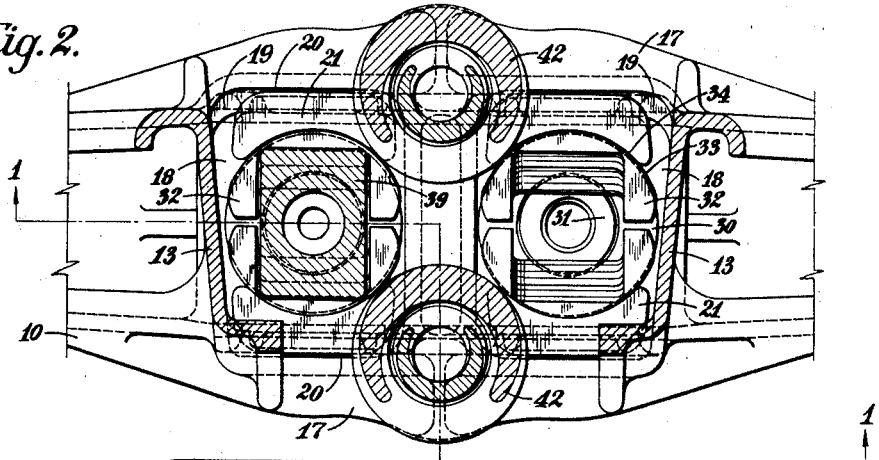
Fig. 3.
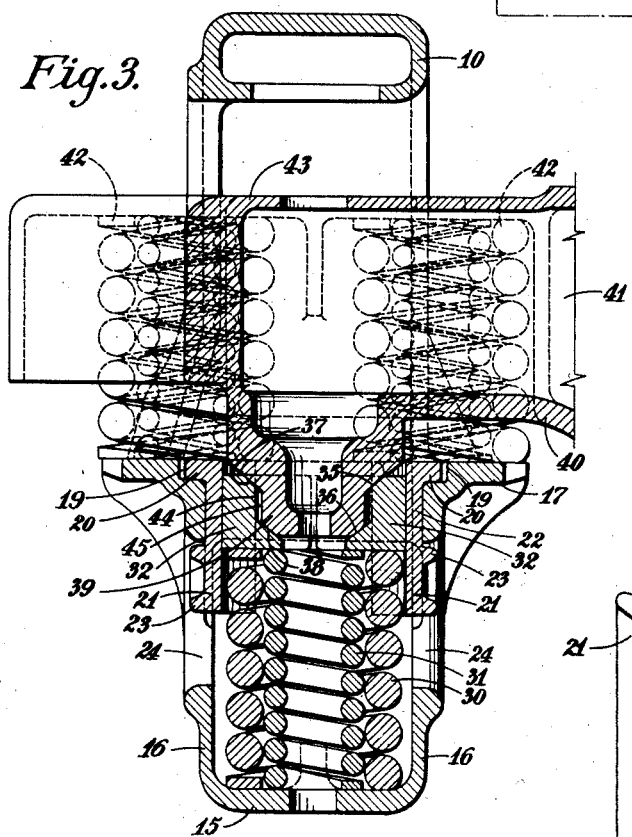
Fig. 4.
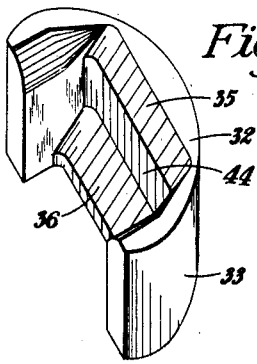
Fig. 5.
Fig. 6.
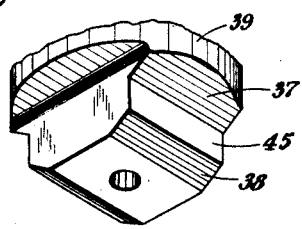
INVENTOR
James A. Shafer
BY Albert E. Field
ATTORNEY Patented Jan. 16, 1940

2,187,434

UNITED STATES PATENT OFFICE 2,187,434

CAR TRUCK

James A. Shafer, East Cleveland, Ohio, assignor to National Malleable and Steel Castings Company, Cleveland, Ohio, a corporation of Ohio Application April 22, 1939, Serial No. 269,507

16 Claims. (Cl. 105—193)

This invention relates to railway car trucks and more particularly to a truck provided with means for damping oscillations of the truck springs.

The principal object of the invention is the provision of simple and effective means for resiliently and frictionally supporting the bolster of the truck so that the frictional support will damp the oscillations of the resilient support and eliminate damage to the car and lading caused by the building up of oscillations of the springs.

A further object is the provision of a friction mechanism in which the parts that are subjected to wear may be readily replaced. In my invention the friction members provide means for bushing the truck and prevent wear on the side frames and bolster.

A still further object of the invention lies in the mounting of the friction members in such a manner that they are locked in position by others of the parts of the truck.

My invention is particularly adapted for use in connection with a truck having a pair of depending projections extending downwardly from the bolster into openings in the side frame. It is an object of the present invention to mount the friction mechanism so that it may move longitudinally of the side frame to compensate for any irregularity of the spacing of the bolster projections. Moreover, the friction shoes may rotate a small amount in case the wedging surfaces on the bolster projections are not parallel to the longitudinal axis of the side frame.

A still further object of my invention is the provision of spaced wedging surfaces on the bolster projections and the shoes of the friction mechanism so as to provide substantially equal pressure on upper and lower portions of the shoes so that the pressure of the shoe against the friction member will be substantially uniform over the vertical extent of the friction surface on the shoe. My invention also provides means for squaring the truck, that is, keeping the side frames substantially perpendicular to the bolster, and returning the members to such position if one side frame moved ahead of the other, as in rounding curves.

Other objects and advantages of the invention will be best understood from the following description taken in conjunction with the drawings, in which:

Figure 2 is a horizontal sectional view taken on line 2—2 of Fig. 1, with one of the bolster projections removed.

Figure 3 is a vertical sectional view taken on line 3—3 of Fig. 1.

Figures 4 and 5 are oblique views of a friction shoe and friction member, respectively; and Figure 6 is an isometric view of the bottom of one of the bolster projections showing the wedging surfaces thereon.

Figure 1:
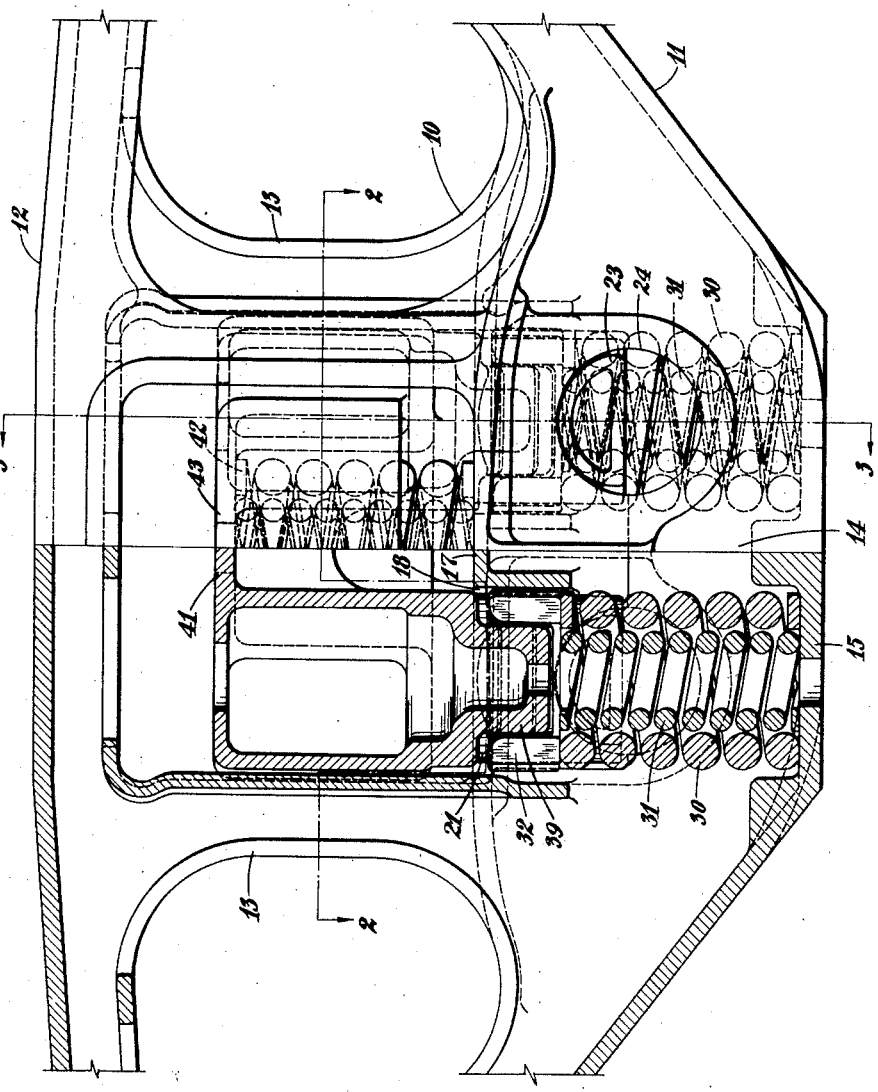
Figure 1 is an elevational view of a car truck embodying my invention, one-half of which is shown in vertical section.

Referring to the drawings, the side frame 10 is formed with a tension member 11, compression member 12 and connecting columns 13, 13. The central portion 14 of tension member 11 is of box-section having a bottom wall 15, side walls 16, 16 and a top wall or shelf 17. Shelf 17 is formed with openings 18, 18 receiving the friction mechanism.

Shelf 17 is recessed at 19 adjacent opposite sides of each of openings 18 for receiving flanges 20 of friction members 21. The tops of these flanges are on substantially the same level as the top of shelf 17. Each friction member is formed with a vertical portion 22 extending into one of openings 18 and at the bottom of said vertical portion is a rib 23 extending laterally outwardly into openings 24 of side wall 16 of the tension member. Upward movement of members 21 is thus limited by engagement of ribs 23 with the top of the associated opening 24. It will be observed that ribs 23 are smaller than openings 24 so that each member 21 may move a limited amount longitudinally of the side frame. Flanges 20 are likewise smaller than openings 18 in a direction longitudinally of the frame to provide for the aforesaid movement.

Mounted on bottom wall 15 of the central portion of the tension member are springs 30, 30 which may, if desired, have inner coils 31, 31. Friction shoes 32, 32 are supported by springs 30 and 31 and each shoe has a curved surface 33 in engagement with a correspondingly curved surface 34 of the associated friction member. On the side opposite surface 33 each shoe is formed with upper and lower wedging surfaces 35 and 36, respectively, that are engaged by correspondingly sloped surfaces 37 and 38 on depending projections 39 which extend downwardly from bottom wall 40 of bolster 41. It will be observed that each shoe 32 extends over an arc of substantially 180-degrees so that a pair of shoes will cover substantially the entire circumference of an associated spring 30, thus providing sufficient bearing area to bridge the scarf on the end of the spring. Friction members 21 extend downwardly into overlapping relation with springs 30 and thus position the latter longitudinally of the side frame.

Upper springs 42, 42 which may comprise inner and outer coils, extend between shelf 17 and upper wall 43 of the bolster to thereby resiliently support the latter on the side frame. Upon downward movement of the bolster, wedging surfaces 37 and 38 on projections 39 will force shoes 32 against friction members 21, thus developing friction to resist further downward movement of the bolster. Since the upper and lower springs are arranged to act in parallel, the friction mechanism will damp out oscillations of all of the springs. It will be observed that friction members 22 are limited in vertical movement by flanges 20 and ribs 23 and furthermore that shoes 32 being forced outwardly by the wedge surfaces on the bolster, hold the friction members in assembled relation to the side frame. Moreover, it can be seen from Fig. 2 that upper springs 42 overlap one end of each friction member to thereby prevent upward movement of the members.

The friction shoes are prevented from rotating about projections 39 of the bolster due to the interengagement of the wedging surfaces on the bolster and shoes. Moreover, by forming the wedging surfaces 35 and 36 of the shoes as two separate surfaces near the top and bottom of each shoe respectively, the lateral component which forces the shoe against its corresponding friction member exerts substantially the same pressure on the top and bottom of the shoe, thereby preventing the latter from being tipped by the concentration of pressure at either the top or bottom thereof. Another advantage of separating the wedging surfaces by vertical surface 44 on shoes 32 and vertical surfaces 45 on bolster projections 39 is that definite stops are provided to limit transverse movement of the bolster relative to the side frame. In my truck the bolster is the sole means for tying the side frames together at their centers. If a single wedging surface extended from the top to the bottom of each shoe with corresponding surfaces on the bolster projections a severe lateral thrust of the bolster might cause the wedging surfaces of the projections to slide up the wedging surfaces of the shoes and result in separating the side frames and bolster. However, upon engagement of surfaces 44 and 45 further lateral and vertical movement of the bolster relative to the side frame, in either direction is effectively prevented.

When one side frame tends to move ahead of the other, as may occur in rounding curves, diagonally opposite wedging surfaces 37 and 38 on the bolster projections will slide up the wedging surfaces 35 and 36 on the corresponding shoes thus causing the bolster to rise. As the aforesaid diagonally opposite wedging surfaces of the bolster projections slide up the corresponding surfaces of the shoes, the other diagonally opposite wedging surfaces of said projections will separate from the surfaces of their corresponding shoes. As the force tending to keep the side frames and bolster out of square lessens, or is removed, the weight of the car body will cause the bolster to move downwardly, and since this weight will be applied at the aforesaid diagonally opposite wedging surfaces which are in engagement, a couple will be produced which acts to bring the side frame back into proper relation to the bolster.

While my truck provides means for returning the bolster and side frames to normal positions when the truck has been forced out of square, my construction is such that a much greater force will be necessary to move the truck out of square than is required with ordinary spring plankless trucks. Before the truck can get out of square, in which position, as previously described, certain of the wedge surfaces on the trunnions will have risen on corresponding wedge surfaces within the side frame, the car body must be raised. However, with the weight of the car body acting upon the truck, the wedge surfaces will normally remain in full engagement and thus maintain the truck in square.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a car truck a side frame having a bolster receiving opening and a shelf therebelow, said shelf having apertures therein, a bolster extending into said opening having lugs projecting downwardly into said apertures, said lugs having wedge surfaces on the bottoms thereof, friction members supported by said side frame and extending into said apertures, said members being smaller than said apertures so as to enable longitudinal movement of said members relative to said side frame, spring means on said side frame beneath said bolster lugs, and friction shoes supported by said spring means and engaging said friction members, said shoes having wedge surfaces engaging the wedge surfaces on said lugs.

2. In a car truck a side frame having a bolster receiving opening and, a shelf therebelow, said shelf having apertures therein, friction members mounted in said apertures for movement longitudinally of said side frame, spring means on said side frame beneath said shelf, friction shoes supported by said spring means and engaging said friction members, and a bolster extending into said opening and having projecting lugs engaging said shoes, said lugs and shoes having wedging means thereon for forcing said shoes into closer frictional engagement with said friction members upon downward movement of said bolster relative to said side frame.

3. In a car truck a side frame having a bolster receiving opening and a shelf therebelow, said shelf having apertures therein, friction members mounted in said apertures for movement longitudinally of said side frame, spring means on said side frame beneath said shelf, friction shoes supported by said spring means and engaging said friction members, and a bolster extending into said opening and having projecting lugs engaging said shoes, said lugs and shoes having vertically spaced wedging means thereon for forcing said shoes into closer frictional engagement with said friction members upon downward movement of said bolster relative to said side frame.

4. In a car truck a side frame having a bolster receiving opening and a shelf therebelow, said shelf having apertures therein, friction members mounted in said apertures for movement longitudinally of said side frame, spring means on said side frame beneath said shelf, friction shoes supported by said spring means and engaging said friction members, and a bolster extending into said opening and having projecting lugs engaging said shoes, said lugs and shoes having vertically spaced wedging surfaces thereon adapted to force said shoes into closer frictional engagement with said friction members upon downward movement of said bolster relative to said side frame, said surfaces being joined by substantially vertical surfaces on said lugs and shoes respectively, adapted to limit lateral movement of said bolster relative to said side frame.

5. In a car truck a side frame having a bolster receiving opening and a shelf therebelow, said shelf having apertures therein and shoulders adjacent said apertures at a lower level than the upper surface of said shelf, friction members mounted in said apertures each having a lateral projection seated on one of said shoulders, spring means on said side frame below said shelf, friction shoes supported by said spring means and engaging said friction members, a bolster having downwardly extending lugs in wedging engagement with said shoes, and spring means between said shelf and bolster for supporting the latter, said last named spring means having portions overlying portions of said friction members to limit upward movement thereof during upward movement of said bolster relative to said side frame.

6. In a car truck a side frame having a bolster receiving opening, said side frame beneath said opening being of box-section comprising upper, lower and side walls, said upper and side walls having openings therein, friction members supported by said upper wall and extending through an opening therein into said box-section, each of said friction members having a rib extending into one of said side wall openings and adapted to engage the upper surface thereof to limit upward movement of said member relative to said side frame, spring means in said box-section, friction shoes supported by said spring means and engaging said friction members, said shoes having wedge surfaces thereon, and a bolster having a lug extending into said upper wall opening and engaging said shoes, said lug having wedging means cooperating with the wedge surfaces on said shoes to move the latter into closer contact with said friction members upon downward movement of the bolster relative to the side frame.

7. In a car truck a side frame having a shelf with an opening therein, spring means on said side frame below said shelf, friction members supported by said shelf and projecting through said opening towards said spring means, a pair of friction shoes supported by said spring means and engaging said friction members, each of said shoes having an inclined plane surface, and a bolster having a lug extending into said opening, said lug having a pair of surfaces engaging said shoe surfaces for urging said shoes into contact with said friction members.

8. In a car truck a side frame having a shelf with an opening therein, spring means on said side frame below said shelf, friction members supported by said shelf and projecting through said opening towards said spring means, a pair of friction shoes supported by said spring means and engaging said friction members, each of said shoes having an inclined plane surface, and a bolster having a lug extending into said opening, said lug having a pair of surfaces engaging said shoe surfaces for urging said shoes into contact with said friction members, said pair of shoes overlying substantially the entire upper surface of said spring means.

9. In a car truck a side frame having a shelf with an opening therein, spring means on said side frame below said shelf, friction members supported by said shelf and movable in said opening longitudinally of said side frame, said members each having a portion extending through said opening towards said spring means, friction shoes supported by said spring means and engaging said friction members, each of said shoes having vertically spaced inclined plane surfaces thereon, and a bolster having a lug extending downwardly into said opening, said lug having vertically spaced inclined plane surfaces engaging said shoe surfaces for wedging said shoes against said friction members upon downward movement of said bolster relative to said side frame.

10. In a car truck a side frame having a shelf with a pair of openings therein, spring means on said side frame below said shelf, a pair of friction members in each of said openings supported by said shelf, a friction shoe engaging each of said friction members said shoes being supported by said spring means, each of said shoes having vertically spaced inclined plane surfaces thereon, a bolster having a pair of lugs extending downwardly into said openings, each of said lugs having vertically spaced inclined plane surfaces engaging corresponding surfaces on an opposite pair of shoes for wedging said shoes against said friction members upon downward movement of said bolster relative to said side frame.

11. In a car truck a side frame having a shelf with a pair of openings therein, spring means on said side frame below said shelf, a pair of friction members in each of said openings supported by said shelf, a friction shoe engaging each of said friction members said shoes being supported by said spring means, each of said shoes having vertically spaced inclined plane surfaces thereon, a bolster having a pair of lugs extending downwardly into said openings, each of said lugs having vertically spaced inclined plane surfaces engaging corresponding surfaces on an opposite pair of shoes for wedging said shoes against said friction members upon downward movement of said bolster relative to said side frame, and means on said shoes and lugs between said vertically spaced surfaces limiting lateral movement of said bolster relative to said side frame.

12. In a car truck a side frame having a shelf with an opening therein, spring means on said side frame below said shelf, friction members supported by said shelf and movable in said opening longitudinally of said side frame, said members each having a portion extending through said opening towards said spring means, friction shoes supported by said spring means and engaging said friction members, each of said shoes having vertically spaced inclined plane surfaces thereon, and a bolster having a lug extending downwardly into said opening, said lug having vertically spaced inclined plane surfaces engaging said shoe surfaces for wedging said shoes against said friction members upon downward movement of said bolster relative to said side frame, and means on said shoes and lug between said vertically spaced surfaces limiting lateral movement of said bolster relative to said side frame.

13. In a car truck a side frame having a shelf with an opening therein, spring means on said side frame below said shelf, friction members supported by said side frame and extending into said opening adjacent said spring means, each of said members having a horizontally curved surface on the side thereof facing said spring means, friction shoes supported by said spring means each having a horizontally curved surface engaging the corresponding surface of one of said members, said shoes having vertically spaced wedging means thereon, and a bolster having a lug extending downwardly into said opening, said lug having wedging means thereon adapted to engage said shoes for urging the latter into contact with said friction members upon downward movement of said bolster relative to said side frame.

14. In a car truck a side frame having a bolster receiving opening and a shelf having apertures therein, a bolster extending into said opening having lugs projecting downwardly into said apertures, each of said lugs being rectangular in cross-section at its lower end, said ends being provided on opposite sides thereof with wedge faces, friction members supported on said side frame and extending into said apertures, spring means on said side frame beneath said bolster lugs, and friction shoes on said springs interposed between said lugs and friction members, said wedge faces engaging corresponding wedge faces on said shoes to urge said shoes into frictional engagement with said members.

15. In a car truck a side frame having a bolster receiving opening and a shelf having apertures therein, a bolster extending into said opening having lugs projecting downwardly into said apertures, each of said lugs having inclined plane surfaces on opposite sides thereof, friction shoes having wedge faces in engagement with said surfaces, friction members supported on said side frame and extending into said apertures, spring means on said side frame beneath said bolster lugs, said shoes being supported by said spring means and adapted to be urged by said lugs into frictional engagement with said members.

16. In a car truck a side frame having a shelf with an opening therein, spring means on said side frame below said shelf, friction members supported on said side frame and extending downwardly through said apertures into overlapping relation with said springs to position the latter longitudinally of said side frame, a pair of friction shoes supported by said spring means and engaging said friction members, each of said shoes having an inclined plane surface, and a bolster having a lug extending into said opening, said lug having a pair of surfaces engaging said shoe surfaces for urging said shoes into contact with said friction members.

JAMES A. SHAFER.